United States Patent
Jayasena et al.

(10) Patent No.: US 11,500,778 B2
(45) Date of Patent: *Nov. 15, 2022

(54) PREFETCH KERNELS ON DATA-PARALLEL PROCESSORS

(71) Applicant: Advanced Micro Devices, Inc., Santa Clara, CA (US)

(72) Inventors: Nuwan S. Jayasena, Sunnyvale, CA (US); James Michael O'Connor, Austin, TX (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/813,075

(22) Filed: Mar. 9, 2020

(65) Prior Publication Data

US 2020/0210341 A1 Jul. 2, 2020

Related U.S. Application Data

(63) Continuation of application No. 13/685,133, filed on Nov. 26, 2012, now Pat. No. 10,585,801.

(51) Int. Cl.
*G06F 12/0862* (2016.01)
*G06F 9/52* (2006.01)
*G06F 8/41* (2018.01)

(52) U.S. Cl.
CPC ........ *G06F 12/0862* (2013.01); *G06F 8/4442* (2013.01); *G06F 9/52* (2013.01); *Y02D 10/00* (2018.01)

(58) Field of Classification Search
CPC ...... G06F 12/0862; G06F 8/4442; G06F 9/52; Y02D 10/00
See application file for complete search history.

(56) References Cited

U.S. PATENT DOCUMENTS

| | | | |
|---|---|---|---|
| 4,888,679 A * | 12/1989 | Fossum | G06F 9/383 |
| | | | 712/6 |
| 5,553,255 A | 9/1996 | Jain et al. | |
| 5,701,448 A | 12/1997 | White | |
| 5,864,697 A | 1/1999 | Shiell | |
| 5,950,007 A | 9/1999 | Nishiyama et al. | |
| 7,631,305 B2 | 12/2009 | Rong et al. | |
| 7,668,740 B1 | 2/2010 | Baggett et al. | |
| 7,814,486 B2 | 10/2010 | Papakipos et al. | |
| 8,035,648 B1 | 10/2011 | Wloka et al. | |
| 8,392,463 B2 | 3/2013 | Gautam et al. | |
| 9,031,825 B1 | 5/2015 | McGaughy | |
| 2001/0052800 A1 | 12/2001 | Mizuno | |
| 2002/0007484 A1 | 1/2002 | Tirumalai et al. | |
| 2004/0049642 A1* | 3/2004 | Liang | G06F 9/3824 |
| | | | 712/E9.046 |

(Continued)

*Primary Examiner* — Nicholas J Simonetti
(74) *Attorney, Agent, or Firm* — Volpe Koenig

(57) ABSTRACT

Embodiments include methods, systems and non-transitory computer-readable computer readable media including instructions for executing a prefetch kernel with reduced intermediate state storage resource requirements. These include executing a prefetch kernel on a graphics processing unit (GPU), such that the prefetch kernel begins executing before a processing kernel. The prefetch kernel performs memory operations that are based upon at least a subset of memory operations in the processing kernel.

20 Claims, 8 Drawing Sheets

(56) References Cited

U.S. PATENT DOCUMENTS

| | | |
|---|---|---|
| 2005/0027941 A1 | 2/2005 | Wang et al. |
| 2005/0138329 A1* | 6/2005 | Subramoney ....... G06F 12/0862 |
| | | 712/207 |
| 2006/0066623 A1 | 3/2006 | Bowen |
| 2009/0125913 A1 | 5/2009 | Bradford et al. |
| 2010/0042786 A1 | 2/2010 | Bell et al. |
| 2011/0010504 A1 | 1/2011 | Wang et al. |
| 2011/0010520 A1 | 1/2011 | Wang et al. |
| 2011/0010521 A1 | 1/2011 | Wang et al. |
| 2011/0119426 A1 | 5/2011 | Boyle et al. |
| 2011/0283067 A1 | 11/2011 | Chen et al. |
| 2011/0283071 A1* | 11/2011 | Yokoya ................. G06F 12/023 |
| | | 711/162 |
| 2011/0307730 A1 | 12/2011 | Marshall et al. |
| 2012/0204060 A1 | 8/2012 | Swift et al. |
| 2012/0272027 A1 | 10/2012 | Zbiciak |
| 2012/0297163 A1 | 11/2012 | Breternitz et al. |
| 2012/0311270 A1* | 12/2012 | Sun ..................... G06F 12/0862 |
| | | 711/E12.004 |
| 2012/0324248 A1 | 12/2012 | Schluessler et al. |
| 2012/0331278 A1 | 12/2012 | Breternitz et al. |
| 2013/0117750 A1 | 5/2013 | Howes et al. |
| 2013/0159664 A1 | 6/2013 | Blinzer et al. |
| 2013/0246708 A1 | 9/2013 | Ono et al. |
| 2014/0007061 A1 | 1/2014 | Perkins et al. |
| 2016/0048394 A1* | 2/2016 | Vorbach ................ G06F 9/3836 |
| | | 712/32 |

\* cited by examiner

PREFETCH KERNELS ON DATA-PARALLEL PROCESSORS

CROSS REFERENCE TO RELATED APPLICATION

This application is a continuation of U.S. patent application Ser. No. 13/685,133, filed Nov. 26, 2012, which is incorporated by reference as if fully set forth.

FIELD OF INVENTION

The present invention is generally directed to improving the scalability and efficiency of data-parallel processors.

BACKGROUND

Current processor architectures rely on concurrent processes to hide memory access latencies. For example, in data-parallel processors, such as graphics processing units (GPU), a large number of concurrently live wavefronts may be used to hide memory access latencies. Memory access latencies include delay involved for an active thread or process to access a memory in order to perform a read or write operation to that memory. Hiding these latencies using a large number of concurrently live wavefronts requires large register files and on-chip memories to store the state of all live wavefronts and their threads incurring excessive overheads in area, power and performance of the processor and computer system. The large size of such storage structures also increases the overhead of context switching and virtualizing data-parallel processors.

Several techniques have been proposed in the art to reduce memory access latencies. Some approaches rely on a central processing unit (CPU) to execute run-ahead threads in order to populate caches for a closely-coupled GPU. Some other approaches propose specializing some wavefronts (also referred to as warps) of a kernel to fetch data from off-chip memory to on-chip memory. Yet another approach proposes switching the GPU to a "runahead mode" upon a page fault exception to detect future page faults.

The approach mentioned above of using the CPU to execute run-ahead threads requires that the CPU and the GPU are closely-coupled, threads occupy both the CPU and the GPU, and the CPU execution stays ahead of the GPU. The approach of dedicating some wavefronts of a kernel to perform prefetching places the data transfer and compute in the same kernel, increasing program complexity and increasing register file and on-chip memory requirements. The approach of switching the GPU to a runahead mode may require additional hardware to support the runahead mode and is only helpful in reducing page fault overheads. Other run-ahead approaches proposed in the context of CPU architectures focus on improving performance and are not geared to addressing the register and memory storage hardware cost considerations of data-parallel architectures.

As data-parallel processors run increasingly larger numbers of concurrent threads, and reduction in power consumption in processors is sought, improved methods and systems for handling memory access latencies are desired. Moreover, as off-chip memory latencies increase and processor evolutions introduce additional sources of memory latency (e.g., Translation Lookaside Buffer misses and page faults) to data-parallel processors, hiding the latency purely through adding more wavefronts becomes increasingly more expensive and, in many cases, impractical.

SUMMARY

Embodiments of this invention are directed to reducing hardware costs of tolerating memory latency in data-parallel processors. Embodiments reduce hardware costs and reduce power consumption associated with executing a compute or graphics kernel on a data-parallel processor by using a prefetch kernel that runs before the compute or graphics kernel. The prefetch kernel allows the Translation Lookaside Buffers, caches of the data-parallel processor, and other memories to warm up so that the execution of the compute or graphics kernel can proceed with reduced memory access latencies and reduced intermediate state storage requirements.

Embodiments include, for example, methods, systems and computer readable media configured to execute a first kernel (e.g., compute or graphics kernel) with reduced intermediate state storage resource requirements. These include executing a first and second (e.g. prefetch) kernel on a data-parallel processor, such that the second kernel begins executing before the first kernel. The second kernel performs memory operations that are based upon at least a subset of memory operations in the first kernel.

Embodiments also include, for example, methods, systems and computer readable media configured to generate a second kernel (e.g., prefetch kernel) for execution on a data-parallel processor based upon memory accesses in a first kernel (e.g., a compute or graphics kernel), so that in response to execution of the first kernel there are reduced intermediate state storage resource requirements. Embodiments include identifying at least a subset of memory operations in a first kernel to be executed on a data-parallel processor and configuring a second kernel to start executing on the data-parallel processor before the first kernel and to perform a first set of memory operations on the data-parallel processor. The first set of memory operations is based upon the identified subset of memory operations in the first kernel.

Further features, advantages and embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

Figure 1:
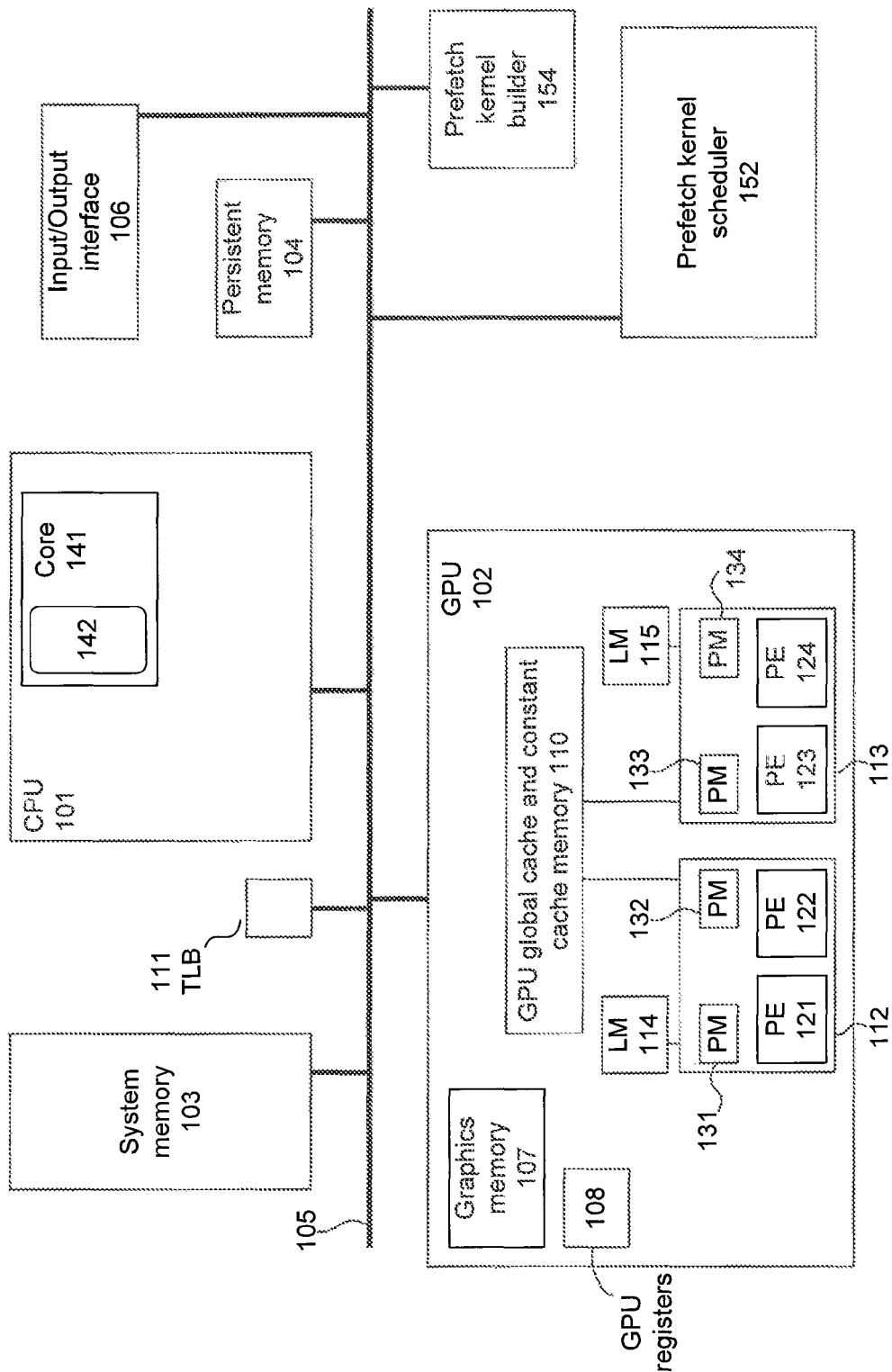
FIG. 1 is a block diagram of a system, in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unlike conventional approaches which have the reduction of memory access latencies as their primary goal, the disclosed embodiments are primarily directed at reducing hardware costs associated with compensating for memory access latencies in data-parallel processors. As the size (e.g., number of concurrent threads or workitems) and number of wavefronts executed on data-parallel processors increase, the on-chip high bandwidth storage used for maintaining the state for those concurrently live wavefronts can become large. On-chip storage, e.g., such as registers and on-chip memory, may be required to maintain state of the wavefronts for the duration of latencies associated with memory accesses. For example, when one or more workitems in a wavefront of a first kernel initiates a long memory access during execution and the system detects that the wavefront would stall until the results from that memory access becomes available, that wavefront may vacate the execution resources in order to enable a wavefront of a second kernel to run. When not in active execution, the state of the first kernel wavefront is saved primarily on on-chip storage, such as register files and local memories. During long memory access latencies of the first kernel wavefront, some of the on-chip storage is dedicated to keeping the saved state of that wavefront for that entire duration it takes for the memory access to complete. The amount of on-chip storage required for the state of wavefronts not in active execution grows with the size and number of simultaneously live wavefronts. A live wavefront, as the term is used here, is a wavefront that has not completed execution. A live wavefront may be currently executing on the processor or may have vacated the execution resources prior to completion of execution.

Embodiments execute a prefetch kernel on a data-parallel processor ahead of the execution of the corresponding compute or graphics kernel there, so that latency causing memory accesses are reduced by having much of the data required by the processing kernel in cache or on-chip storage at the time of its execution. A prefetch kernel is light-weight and entirely or almost entirely consists of instructions for accessing memory locations that are accessed by the corresponding processing kernel. Prefetch kernels are automatically generated when the corresponding processing kernels are compiled. A "processing kernel," as the term is used herein, is a compute kernel or a graphics kernel, By including substantially only memory access instructions that are needed for the corresponding processing kernels, embodiments use minimal on-chip storage for prefetch kernels even though the prefetch kernels contain long latency memory accesses. The reduction in size of the required on-chip storage may result in reduced hardware costs and reduced energy consumption, as well as overall performance gains due to reduced state movement when context switching or virtualizing of data-parallel processor resources. Moreover, by having a separate corresponding prefetch kernel for each processing kernel, embodiments maintain flexibility in scheduling the kernels optimally. Flexible scheduling can lead to significant reductions in the size of storage required to maintain the relevant state. Moreover, by executing the prefetch kernel on the same processor as the processing kernels, embodiments ensure that memories accessed by the data-parallel processor are better prepared for the processing kernels and also leaves open the option to transition the CPU (or other associated processor) to sleep during the interval in which the data-parallel processor performs its execution.

FIG. 1 is a block diagram illustration of a system 100 that employs prefetech kernels to reduce the pressure on on-chip registers and memory in a data-parallel processor, in accordance with an embodiment. In FIG. 1, an example heterogeneous computing system 100 can include one or more CPUs, such as CPU 101, and one or more data-parallel processors, such as GPU 102. Heterogeneous computing system 100 can also include system memory 103, a persistent memory 104, a system bus 105, an input/output device 106, a prefetch kernel scheduler 152 and a prefetch kernel builder 154.

CPU 101 can include a commercially available control processor or a custom control processor. CPU 101, for example, executes the control logic that controls the operation of heterogeneous computing system 100. CPU 101 can include one or more cores, such as core 141. CPU 101, in addition to any control circuitry, may include cache memories, such as CPU cache memory 142 associated with core 141. CPU cache memories can be used to temporarily store instructions and/or parameter values during the execution of an application on the CPU.

GPU 102 can be any data-parallel processor. GPU 102, for example, can execute specialized code for selected functions for graphics processing or computation. Selected graphics or computation functions that are better suited for data-parallel processing can be more efficiently run on. GPU 102 than on CPU 101.

In this example, GPU 102 includes a GPU global cache memory 110 and a plurality of compute units 112 and 113. A graphics memory 107 can be included in, or coupled to, GPU 102. Each compute unit 112 and 113 is associated with a GPU local memory 114 and 115, respectively. Each compute unit includes one or more GPU processing elements (PE). For example, compute unit 112 includes GPU processing elements 121 and 122, and compute unit 113 includes GPU PEs 123 and 124.

Each GPU processing element 121, 122, 123, and 124, is associated with at least one private memory (PM) 131, 132, 133, and 134, respectively. Each GPU PE can include one or more of a scalar and vector floating-point units. The GPU PEs can also include special purpose units, such as inverse-square root units and sine/cosine units. GPU global cache memory 110 can be coupled to a system memory, such as system memory 103, and/or graphics memory, such as graphics memory 107.

System memory 103 can include at least one non-persistent memory, such as dynamic random access memory (DRAM). System memory 103 can store processing logic instructions, constant values, and variable values during execution of portions of applications or other processing logic. The term "processing logic," as used herein, refers to control flow instructions, instructions for performing computations, and instructions for associated access to resources.

System 100 may also include a Translation Lookaside Buffer (TLB) 111. TLB 111 is a cache used to efficiently access page translations. For example, TLB 111 caches some virtual to physical address translations that are performed so that any subsequent accesses to the same pages can use the TLB 111 entries rather than performing the translation. The TLB is typically implemented as content-addressable memory (CAM). A CAM search key is a virtual address and a search result is a physical address. If the requested address is present in the TLB, the CAM search yields a match and the retrieved physical address can be used to access memory. This is referred to as a TLB hit. If the requested address is not in the TLB (referred to as a TLB miss), and the translation proceeds by looking up the page table in a process referred to as a page walk. The page table is in memory (such as system memory 103), and therefore page walk is an expensive process, as it involves reading the contents of multiple memory locations and using them to compute the physical address. After the physical address is determined by the page walk, the virtual address to physical address mapping is stored in the TLB.

In virtualization environments (e.g., when system 100 supports virtual machines), TLB 111 may maintain separate mappings for each virtual machine that is currently active in system 100. In some embodiments, TLB 111 may include a TLB located within CPU 101, and may also include one or more TLBs within GPU 102.

Persistent memory 104 includes computer readable media, such as one or more storage devices capable of storing digital data, such as magnetic disk, optical disk, or flash memory. Persistent memory 104 can, for example, store at least parts of logic of prefetch kernel builder 154 and prefetch kernel scheduler 152. At the startup of heterogeneous computing system 100, the operating system and other application software can be loaded in to system memory 103 from persistent storage 104.

System bus 105 can include a Peripheral Component Interconnect (PCI) bus, Industry Standard Architecture (ISA) bus, PCI Express (PCIe) or Accelerated Graphics Port (AGP) or such a device. System bus 105 can also include a network, such as a local area network (LAN), along with the functionality to couple components, including components of heterogeneous computing system 100.

Input/output interface 106 includes one or more interfaces connecting user input/output devices such as keyboard, mouse, display and/or touch screen. For example, user input can be provided through a keyboard and mouse connected user interface 106 to heterogeneous computing system 100. The output of heterogeneous computing system 100 can be output to a display through input/output interface 106.

In this example, graphics memory 107 is coupled to system bus 105 and to GPU 102. Graphics memory 107 is, in general, used to store data transferred from system memory 103 for fast access by the GPU. For example, the interface between GPU 102 and graphics memory 107 can be several times faster than the system bus interface 105.

GPU 102 may also include GPU registers 108. GPU registers 108 include a plurality of hardware registers, which may include one or more of groups of registers that are shared between all compute units and groups of registers that are shared between selected processing elements. GPU registers 108 may be used, for example, to store the intermediate state of threads or workitems that are currently executing and also to store the state of threads or workitems executing on the processing elements when they are context-switched, In one example, prefetch kernel scheduler 152 includes logic to dispatch processing kernels for execution on GPU 102, and also to dispatch corresponding prefetch kernels for execution ahead in time as compared to the processing kernels. Prefetch kernel scheduler 152 is described in relation to FIGS. 2B and 3-8 below.

Although shown in FIG. 1 as located outside GPU 102, prefetch kernel scheduler 152 may be implemented as a component of GPU 102. For example, prefetch kernel scheduler 152 may be a part of the logic of a dispatcher device (not shown) of GPU 102, where the dispatcher device is responsible for issuing the next instruction to be processed by GPU 102.

A person of skill in the art will understand that prefetch kernel scheduler 152 can be implemented using software, firmware, hardware, or any combination thereof When implemented in software, for example, prefetch kernel scheduler 152 can be a computer program written in C or OpenCL, that when compiled and executing resides in system memory 103. In source code form and/or compiled executable form, prefetch kernel scheduler 152 can be stored in persistent memory 104. In one embodiment, some or all of the functionality of prefetch kernel scheduler 152 is specified in a hardware description language, such as Verilog, RTL, netlists, etc. to enable ultimately configuring a manufacturing process through the generation of mask works/photomasks to generate a hardware device embodying aspects of the invention described herein.

Prefetch kernel builder 154 includes logic to analyze processing kernels that are to be executed on GPU 102 and to generate corresponding prefetch kernels that can be executed in order to perform tasks, such as, but not limited to, prefetch data from off-ship memories to local memories and to perform address translations, where necessary. For example, prefetch kernel builder 154 may identify instances in the code of the processing kernel where an access is required to off-chip memory, and may insert a corresponding memory access in the corresponding prefetch kernel. Generation of prefetch kernels, as performed, for example, by prefetch kernel builder 154, is described below in relation to FIGS. 2A and 3-8.

According to an embodiment, in system 100, GPU 102 may be used as a specialized accelerator for selected functions. GPU 102 is substantially more efficient than CPU 101 for many graphics related functions, as well as for tasks such as, but not limited to, ray tracing, computational fluid dynamics and weather modeling that involve a high degree of parallel computations. GPUs used for non-graphics related functions are sometimes referred to as general purpose graphics processing units (GPGPU). Additionally, in some embodiments, CPU 101 and GPU 102 may be on a single die.

Figure 2B:
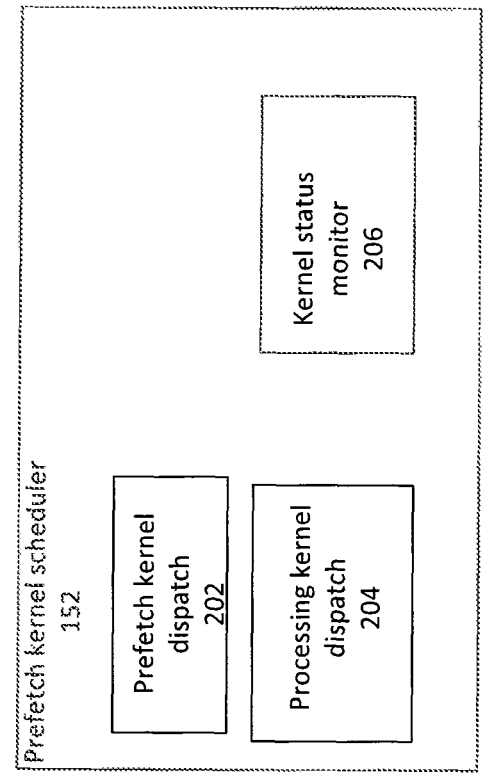
FIG. 2B is a block diagram illustrating a prefetch kernel scheduler, in accordance with an embodiment.
Figure 2A:
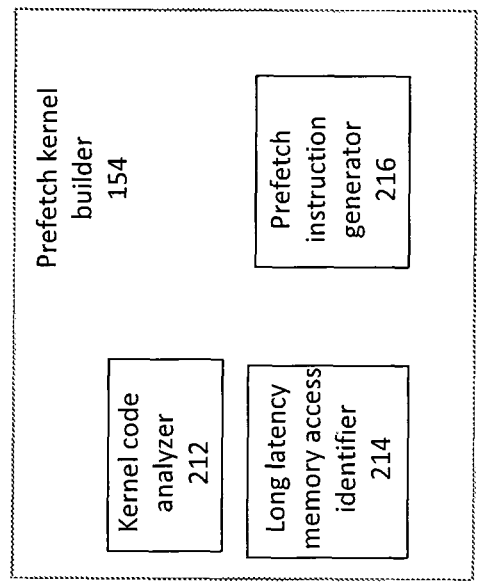
FIG. 2A is a block diagram illustrating a prefetch kernel compiler module, in accordance with an embodiment.

FIG. 2A is a block diagram illustrating a prefetch kernel builder 154, in accordance with an embodiment. A kernel code analyzer 212 operates to analyze processing kernel code. The kernel code that is analyzed can be in the form of one or more programming languages such as C, OpenCL and CUDA ("Compute Unified Device Architecture"), and may, in some embodiments, be in an intermediate binary code form. Prefetch kernel builder 154 also includes a long latency memory access identifier 214 and a prefetch instruction generator 216. Long latency memory access identifier 214 operates to identify the memory accesses among the memory accesses in the processing kernel that incur long latencies. Prefetch instruction generator 216 operates to generate instructions for the prefetch kernel that would access the memory locations accessed by the processing kernel.

FIG. 2B is a block diagram illustrating a prefetch kernel scheduler 152, in accordance with an embodiment. Prefetch kernel scheduler 152 includes a prefetch kernel dispatch 202, a processing kernel dispatch 204, and a kernel status monitor 206. Prefetch kernel dispatch 202 operates to determine when the next prefetch kernel can be dispatched for execution. Processing kernel dispatch 204 operates to determine when, after the dispatch of the corresponding prefetch kernel, a processing kernel is to be dispatched. Kernel status monitor 206 operates to monitor the status of prefetch kernels and/or selected storage populated by memory accesses by the prefetch kernels.

Figure 3:
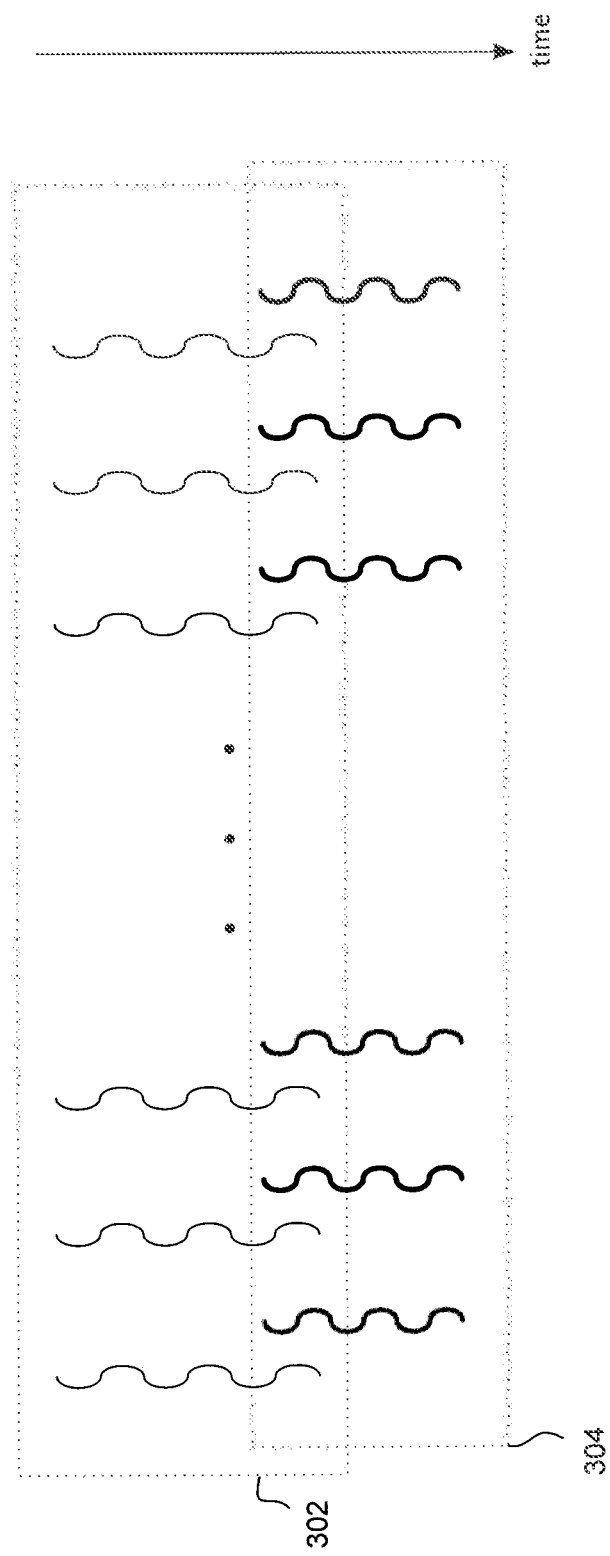
FIG. 3 is a sketch illustrating an exemplary scheduling of prefetch kernels and corresponding processing kernels, according to an embodiment.

FIG. 3 is a sketch illustrating an exemplary scheduling of prefetch kernels and corresponding processing kernels, according to an embodiment. The lighter-colored curved lines illustrated in portion 302 represent a wavefront of a prefetch kernel. The heavier-colored curved lines illustrated in portion 304 represent a wavefront of a processing kernel. The illustrated prefetch kernel and processing kernel form a pair, in that the prefetch kernel comprises memory accesses from the processing kernel. FIG. 3 illustrates that the wavefront of the prefetch kernel begins execution ahead in time compared to the wavefront of the processing kernel. The prefetch kernel would generally comprise only memory access instructions and would be substantially more light-weight (e.g., have only minimal intermediate state) than the processing kernel. However, in relation to memory accesses, because the prefetch kernel includes the initial accesses to many of the memory locations accessed in the processing kernel, the length of time over which the prefetch kernel executes may not be reduced relative to the processing kernel.

Figure 4:
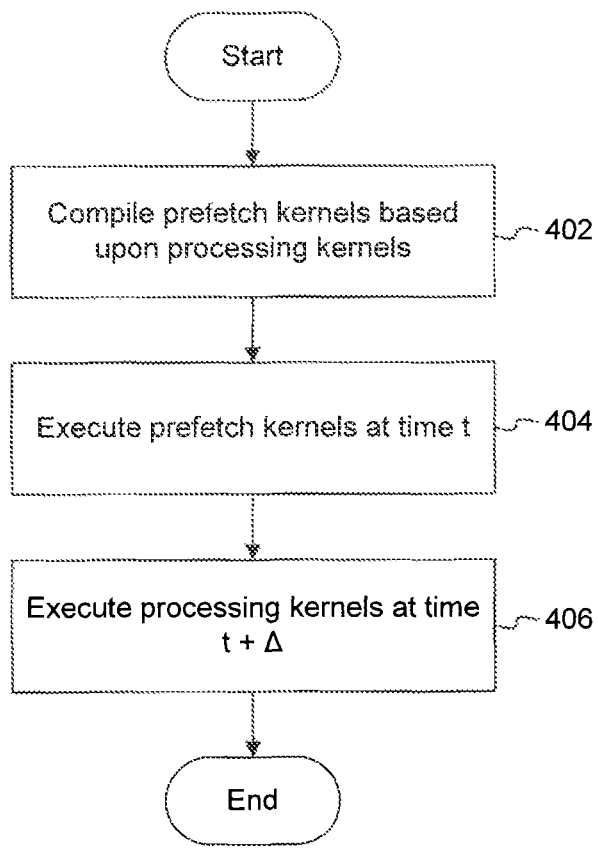
FIG. 4 is a flowchart of a method for executing kernels in a data-parallel processor, according to an embodiment of the present invention.

FIG. 4 illustrates a flowchart of a method 400 for executing processing kernels in a data-parallel processor, according to an embodiment of the present invention. Method 400 executes corresponding prefetch kernels ahead of the execution of processing kernels in order to reduce the hardware overhead associated with hiding the memory access latencies in a data-parallel processor. In one example, method 400 operates using a system as described above in FIGS. 1-3. It is to be appreciated method 400 may not be executed in the order shown or require all operations shown.

Operation 402 generates prefetch kernels for execution on a data-parallel processor based upon processing kernels.

According to an embodiment, one or more prefetch kernels are generated for each processing kernel. For ease of description, without loss of generality, we consider one prefetch kernel generated for each processing kernel.

According to another embodiment, a prefetch kernel is generated for each processing kernel that is selected according to criteria, such as, but not limited to, having memory latencies exceeding a threshold.

According to yet another embodiment, the estimated total memory latencies of the kernel is multiplied by the expected number of concurred workitems for that kernel in order to determine the amount of state to be maintained, and the kernel is selected for the generation of a corresponding prefetch kernel if the amount of state to be maintained exceeds a threshold. The thresholds (e.g., threshold for total memory latency of a kernel, threshold for state to be maintained) can be preconfigured or may be dynamically determined.

The total memory latencies of a kernel may be estimated based upon analyzing the kernel code to determine memory accesses, and associating each memory access with a latency derived from profiling or configuration. The kernel code may be in, but is not limited to, the form of a C or other computer programming language program function. The kernel code may also include extensions such as, but not limited to, OpenCL and CUDA. The generation of prefetch kernels is described in relation to FIGS. 5-6.

In one example, the prefetch kernel corresponding to a processing kernel comprises one or more memory access instructions. Specifically, the memory instructions in the prefetch kernel are directed to access memory addresses used in the processing kernel. Ideally the prefetch kernel would have only memory accesses corresponding to those in the processing kernel. Having only the desired (e.g., addresses used in processing kernel) memory accesses in the prefetch kernel results in the prefetch kernel being lightweight and having minimal intermediate state. By having prefetch kernels with all latency-inducing memory accesses, but only minimal or substantially minimal state (e.g., only the state necessary to determine the memory addresses), the amount of hardware used to maintain state is minimized.

According to an embodiment, memory access instructions and associated address calculation from the processing kernel are identified and the same or corresponding instruction is inserted in the prefetch kernel. In some embodiments, only instructions with memory addresses that can be statically determined are written to the prefetch kernel. Statically determinable memory accesses include, but are not limited to, constant offset accesses into data structures, offsets into data structures computed as functions of the workitem indices, and other data accesses whose address computations do not depend on input data. In one example, any floating point or arithmetic and logic unit computations are kept to a minimum in the prefetch kernels. Note that, like the processing kernel, the prefetch kernel executes as a plurality of concurrent threads and each thread instantiation may access respective memory locations.

In an alternative embodiment, instructions that require small amounts of address computations may also be inserted in the prefetch kernels, including the instructions required for the relatively small amount of required computation to determine addresses that are not statically determinable. Note that because the prefetch kernels are executed at run-time, all of a processing kernel's input arguments are available to the corresponding prefetch kernel, thus making it possible for the prefetch kernel to compute some input data-dependent memory addresses. However, additional computations should be used sparingly because of the resulting increase in intermediate state of the prefetch kernel.

The prefetch kernel that is generated based upon memory accesses in a processing kernel is then made available for execution on a data-parallel processor. Making the prefetch kernel available for execution may include creating a compiled version of the prefetch kernel. The compiled version may be in the form of machine code, which can be directly executed by the data-parallel processor, or in the form of a binary that can be interpreted by the data-parallel processor.

Operation 402 may be performed at any time before operations 404-406, to generate the prefetch kernels. According to an embodiment, prefetch kernels are generated when the application source code is compiled and an executable created. In another embodiment, prefetch kernels may be generated when a CPU enqueues the corresponding processing kernels to be executed by a data-parallel processor.

Operation 404 dispatches the generated prefetch kernels for execution. After identifying the next processing kernel to be executed on the data-parallel processor, the corresponding prefetch kernel is dispatched. The identification may be done in accordance with any scheduling technique of the CPU and/or data-parallel processor. The dispatching of the prefetch kernel results in one or more wavefronts, where each wavefront comprises a plurality of concurrently executing workitems. Respective workitems from the prefetch kernel can concurrently execute on all or a subset of the processing elements of the data-parallel processor. The execution of the prefetch kernel results in one or more of the following: any unmapped memory pages are mapped and/or fetched from disk storage by handling page faults; TLBs are populated with page translations for pages that are accessed; and data is fetched from off-chip memory to on-chip caches.

Even though there may be long stalls when above mentioned memory system events take place, the prefetch kernel has minimal intermediate state and occupies only a relatively small number of registers and other storage. Therefore, the negative effects of resource occupancy while waiting for long-latency memory operations to complete is minimized. Moreover, if the prefetch kernel is to be context-switched out during a long-latency event, the cost of the switch is relatively small due to the small register state associated with the prefetch kernel.

Operation 406 is performed following operation 404. Operation 406 dispatches the processing kernel associated with the immediately preceding prefetch kernel. The dispatch of the processing kernel can occur at any time after the start of execution of the corresponding prefetch kernel. According to some embodiments, the compute (or graphics) kernel is dispatched for execution after a configured time interval from the start of execution of the corresponding prefetch kernel, or when the dispatcher seeks the next kernel to be deployed (e.g., because prefetch kernel has been context switched). According to another embodiment, the processing kernel begins execution immediately following the completion of execution of the corresponding prefetch kernel.

In some embodiments, the system may dynamically determine when, after the start of execution of the prefetch kernel, the processing kernel is to start execution. Various criteria may be considered. For example, it must be ensured that there is no other activity between the accessing of a memory location by a prefetch kernel and the accessing of that memory location by the processing kernel such that any prefetched data and/or address translations that was performed upon the request of the prefetch kernel are replaced.

In another embodiment, in systems with fine-grained scheduling capabilities at the sub-kernel level, both the processing kernels and prefetch kernels can be dispatched at the same time with the constraint that individual processing kernel workgroups (or wavefronts) are launched only after the corresponding prefetch workgroups (or wavefronts) complete.

Even though the processing kernel may occupy a relatively large amount of register and other storage, the processing kernel can encounter fewer long-latency memory events due to the caches and other memory structures being populated by the prefetch kernel. As a result, high resource utilization can be primarily limited to periods of active computation.

The scheduling of the processing kernel is further discussed below in relation to FIGS. 7-8.

Figure 5:
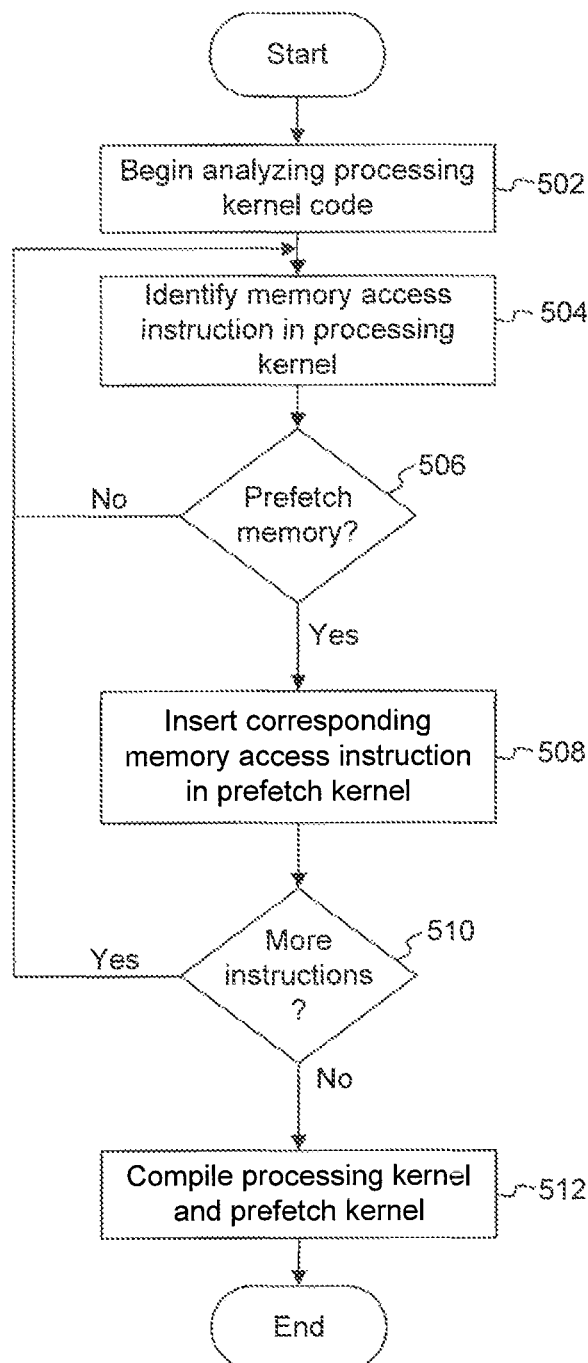
FIG. 5 is a flowchart of a method for compiling prefetch kernels, according to an embodiment of the present invention.

FIG. 5 is a flowchart of a method 500 for generating prefetch kernels, according to an embodiment of the present invention. Method 500 may be performed in operation 402 discussed above. In an embodiment, one or more of the operations 502-512 of method 500 may not be performed, and/or operations 502-512 may be performed in an order other than that shown.

At operation 502, a system, such as a compiler, commences the analysis of the processing kernel code to identify memory access instructions. A prefetch kernel can be initialized. Initialization may include creating an empty file or memory area in which to encode the instructions to be determined based upon the processing kernel.

At operation 504, a memory access instruction is identified. A memory access instruction is an instruction which includes an associated access to memory.

At operation 506, it is decided whether to prefetch the memory in accordance with the identified instruction. The decision to prefetch a particular memory location is based upon one or more configured criteria. Some of the criteria that may be considered are described below in relation to method 600.

If, at operation 506, it is determined not to prefetch the currently identified memory location, then processing of method 500 returns to operation 504 to identify the next memory access instruction.

On the other hand, if it is determined to prefetch the memory location identified at operation 506, then method 500 proceeds to operation 508.

At operation 508, an instruction based upon the identified instruction is encoded in the prefetch kernel code. The encoded instruction (i.e., the instruction encoded in the prefetch kernel code) may be identical to the corresponding instruction in the processing kernel. Alternatively, the encoded instruction would include an access to the same memory location as the corresponding processing kernel instruction but may be a different type of instruction than the processing kernel instruction.

At operation 510, it is determined whether more instructions are to be analyzed in the processing kernel, and if yes, method 500 returns to identify the next memory access at operation 504. If, however, no more instructions are to be analyzed, then method 500 proceeds to operation 512.

At operation 512, the processing kernel and the generated prefetch kernel are compiled to form two separately executable kernels. As noted above in relation to FIG. 4, the compiling of the kernels can be performed to generate executable machine code or code that can be interpreted by the data-parallel processor.

Figure 6:
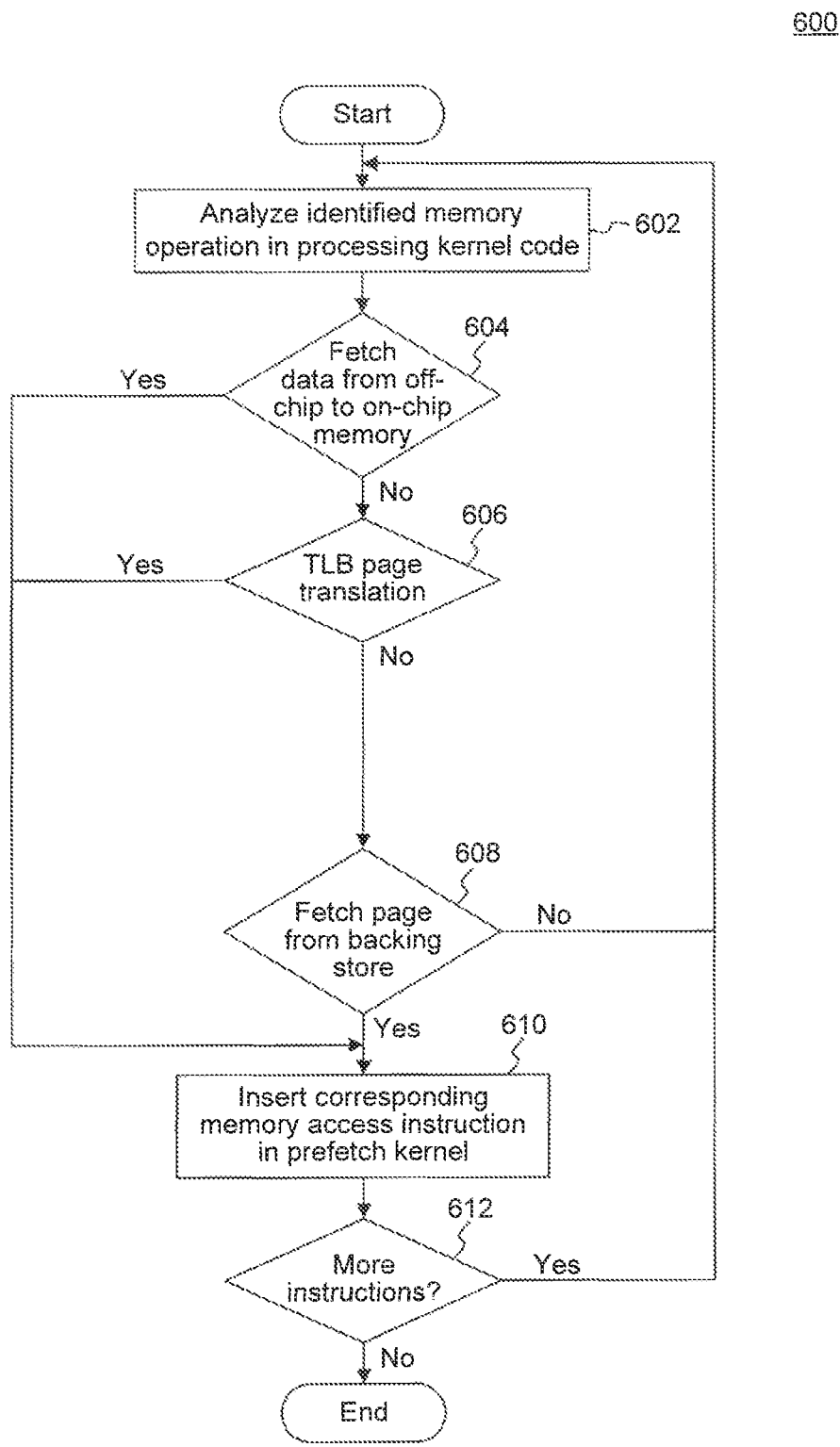
FIG. 6 is a flowchart of a method of selecting memory accesses for prefetch kernels, according to an embodiment of the present invention.

FIG. 6 is a flowchart of a method 600 of selecting memory accesses for prefetch kernels, according to an embodiment of the present invention. According to an embodiment method 600 may be performed in operation 506 discussed above. In an embodiment, one or more of the operations 602-612 may not be performed in method 600, and/or operations 602-612 may be performed in an order other than that shown.

At operation 602, an identified memory access operation is analyzed.

At operation 604, it is determined whether the identified instruction would result in data being fetched from off-chip memory to on-chip memory. For example, whether data would be fetched from system memory 103 to GPU cache 110 and/or to one or more of LM 114-115 or PM 131-134. If yes, method 600 proceeds to operation 610, discussed below. If no, method 600 proceeds to operation 606.

At operation 606, it is determined whether the identified instruction would result in a TLB page translation. For example, a TLB miss for a requested memory address would result in the page being identified in system memory 103 (or other memory) and a corresponding virtual to physical address mapping being inserted in the TLB. If yes, method 600 proceeds to operation 610, discussed below. If no, method 600 proceeds to operation 608.

At operation 608, it is determined whether the identified instruction would result in a page being fetched from a backing store (e.g., disk) to memory. For example, the memory access would result in a page fault, and the system responds to the page fault by fetching the relevant page from persistent memory 104 to system memory 103 and/or one or more of graphics memory 107, GPU global cache 110, LM 114-115, or PM 131-134. If yes, method 600 proceeds to operation 610, discussed below. If no, method 600 returns to operation 602.

The determination in each of operations 604-608 can be based upon an internal data structure configured to keep track of respective memory locations and or pages being accessed by a kernel, and in some embodiments, by other kernels preceding the kernel being analyzed. For example, an internal data structure may be used to inform the prefetch kernel builder or a compiler whether a particular page is being accessed for the first time by the kernel, or how far apart (e.g., in terms of other memory accesses occurring in between) two consecutive accesses to the same memory location are. Additionally or alternatively, the determinations in operations 604-608 can be based upon profiles of kernels and kernel execution patterns in the data-parallel processor.

As indicated above, if at least one of the operations 604-608 indicated "yes", then method 600 proceeds to operation 610 to form a corresponding instruction to be written to the prefetch kernel. As each instruction completes analysis, at operation 612, it is determined whether further instruction in the processing kernel are to be analyzed.

In an embodiment, where a prefetch kernel is only used to tolerate very long memory events such as page faults and TLB misses, the prefetch kernel need not generate all statically determinable memory accesses of the processing kernel. Rather, a single memory access per relevant page can be made from the prefetch kernel. Further, the prefetch kernel can be structured such that each access to a new page is made by a different workitem of the prefetch kernel. This would ensure that the detection and handling of multiple page faults and TLB misses can be overlapped to avoid intra-workitem serialization of multiple TLB misses and/or page faults. In these cases, the prefetch kernel may, instead of inserting a corresponding memory access instruction in the prefetch kernel, insert a TLB fill probe operation, which causes the mapping of unmapped pages and warms TLBs without performing actual memory accesses. Additionally, the faulting wavefronts of the prefetch kernel do not need to resume after the faults have been handled since the only objective of each work item is to trigger a single page touch to ensure the page is mapped and the translations are in the TLBs. This allows context switching of prefetch kernels due to page faults to be optimized in this case to not save/restore their wavefront state but to, kill wavefronts with outstanding page faults on a pre-emption by system software, and to resume kernel execution from the first unexecuted work item when rescheduled by system software.

In another embodiment, the prefetch kernel may include instructions to access a particular page more than once, but during execution would access the page only the first time a corresponding instruction is encountered. The prefetch kernel may maintain an internal data structure to keep track of the pages it has accessed.

Figure 7:
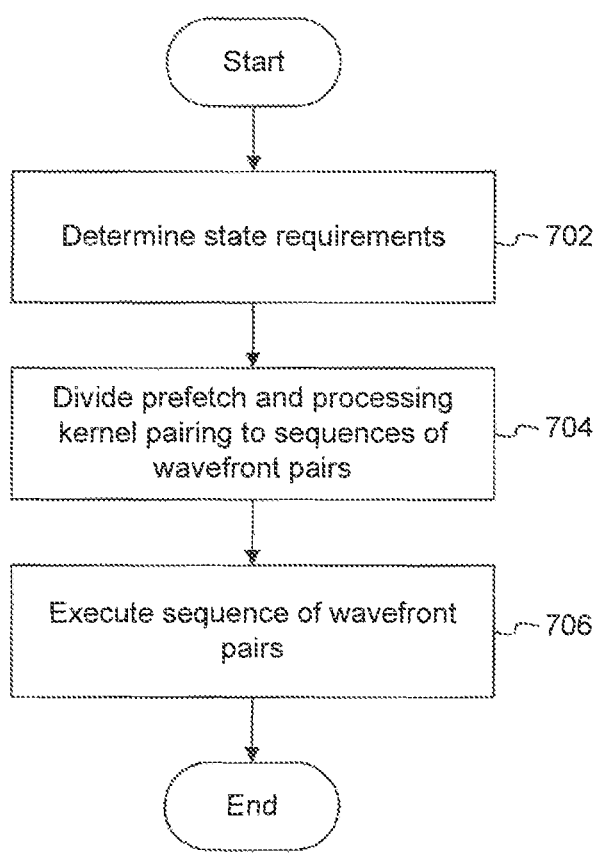
FIG. 7 is a flowchart of a method of scheduling wavefronts of prefetch kernels and compute or graphic kernels, according to an embodiment of the present invention.

FIG. 7 is a flowchart of a method 700 of scheduling wavefronts of prefetch kernels and processing kernels, according to an embodiment of the present invention. According to an embodiment, method 700 can be employed in performing operations 404-406 discussed above.

At operation 702, the state requirements of the prefetch kernel and corresponding processing kernel are determined. The required state can be estimated, for example, based upon the number of workitems to be started for the processing kernel, and the size of intermediate state required for each workitem.

At operation 704, it is determined whether to execute the processing kernel as a single wavefront or as multiple wavefronts. The determination is based upon the amount of state to be stored and the on-chip storage available.

Note that, each execution of a wavefront of workitems of the processing kernel, is immediately preceded by a wavefront of workitems of the corresponding prefetch kernel.

At operation 706, the sequence of paired wavefronts is executed. The sequence includes one or more pairings of a prefetch kernel wavefront followed by a processing kernel wavefront.

Figure 8:
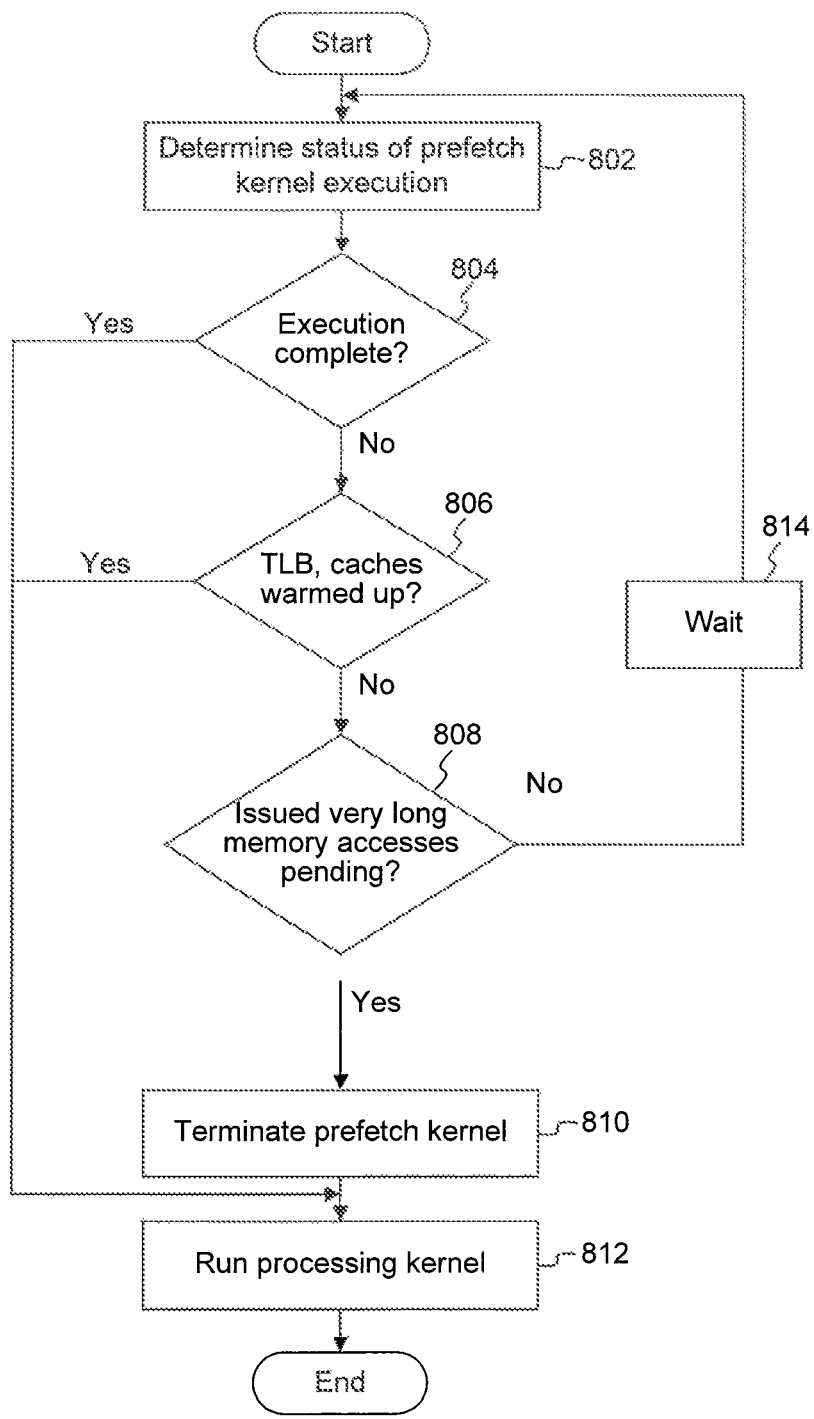
FIG. 8 is a flowchart of a method of scheduling prefetch kernels and corresponding processing kernels, according to an embodiment of the present invention.

FIG. 8 is a flowchart of a method 800 for scheduling prefetch kernels and corresponding processing kernels, according to an embodiment of the present invention. Method 800 may be employed in performing steps 404-406 discussed above, according to an embodiment. It should be noted that, in an embodiment, one or more operations 802-812 may not be performed in method 800, and/or may be performed in an order other than that shown in FIG. 8.

At operation 802, the status of the currently executing prefetch kernel is determined. As noted above, prefetch kernels, although small and having minimum state, can incur long latencies because they include the memory accesses from the processing kernels.

At operation 804, it is determined whether the prefetch kernel has completed execution. If yes, then method 800 proceeds to operation 812 where the processing kernel is executed.

If, at operation 804, it is determined that the prefetch kernel is still active, then at operation 806 it is determined whether TLB and caches are adequately "warmed up" for the processing kernel to follow. The TLB is "warmed up" if it includes some or all of the virtual to physical address translations that would be needed for the processing kernel. Caches are "warmed up" if they include some or all of the data needed by the processing kernel that would follow. The determination whether TLB and/or caches are adequately warmed up may be based upon one or more configuration parameters. For example, the refreshing of a configured portion of the TLB entries and/or the refreshing of a configured portion of cache space can be considered as "adequate" warming up of the storage resources.

If, at operation 806, it is determined that the TLB and/or caches are adequately warmed up, then method 800 proceeds to operation 810. At operation 810, the prefetch kernel is terminated. Termination of the prefetch kernel may include either context switching the prefetch kernel so that the corresponding processing kernel can be run, or completely terminating the execution of the prefetch kernel. Completely terminating the execution does not require saving any of the prefetch kernel state. In both cases, however, the TLB and the caches are not flushed, so that the data obtained and the addresses translated by the prefetch kernel remains for use by the processing kernel.

If, at operation 806, it is determined that the TLB and/or caches are not warmed up, then method 800 proceeds to operation 808. At operation 808, it is determined whether the prefetch kernel has any issued memory access of very long latency. Page faults, for example, are an example of a memory access resulting in a very long latency. If yes, then method 800 may proceed to operation 810.

At operation 810, the prefetch kernel may be context switched to allow the compute kernel or other kernel to execute. In another embodiment, instead of context switching out the prefetch kernel, the system can terminate the prefetch kernel and release the register file and scheduling resources used for that kernel without waiting for all the long latency memory operations initiated by that prefetch kernel to complete. In particular, the prefetch kernel can terminate if all of its instructions have been issued and the only remaining operations outstanding are load operations that specify a destination location private to the prefetch kernel (e.g., PM 131-134 or LM 114-115) for the load results or load operations that have invalid register destinations specified and effectively only bring the data into the cache (e.g., cache 110) or trigger a long-latency memory access such as a TLB miss or page fault. This can allow for more long-latency accesses to be in-flight with a fixed number of registers, or alternatively can reduce the register file size.

If neither condition 806 or 808 is satisfied by the current prefetch kernel, then method 800 can wait 814 for some duration and proceed to operation 802.

In another embodiment, hardware costs may be further reduced by provisioning specialized execution resources for prefetch kernels as they require only a subset of the capabilities of typically required by processing kernels. For example, computations are mostly only integer address calculations. These may include specialized execution resources with simpler ALUs and register and memory structures.

Profiling and other analysis techniques may be used to selectively generate prefetch kernels only for kernels that are expected to incur high amounts of long-latency memory operations.

Prefetch kernels that only access statically-analyzable addresses can be generated such that no general purpose register or LDS state is retained across page faults. In such cases, context switching out faulted prefetch kernels may only involve saving a program counter and a small amount of metadata but not general state data, making such operations fast and efficient.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
    generating one or more prefetch kernels for a processing kernel, wherein each of the one or more prefetch kernels include one or more memory access instructions that are directed to access memory addresses used in the processing kernel; and
    executing, by a graphics processing unit (GPU), the one or more prefetch kernels and the processing kernel, wherein the one or more prefetch kernels are executed ahead of the processing kernel to access one or more memory locations before instructions to access the memory locations are executed by the processing kernel.

2. The method of claim 1, wherein the one or more prefetch kernels are generated by identifying memory access instructions from the processing kernel that can be statically determined.

3. The method of claim 1, wherein the one or more prefetch kernels are generated by combining identified memory access instructions from the processing kernel.

4. The method of claim 1, wherein the one or more prefetch kernels are executed to perform memory tasks including any one or a combination of the following:
- fetching data from off-chip memory to on-chip memory, wherein the data fetched is used by the processing kernel;
- updating one or more page address mapping in a translation lookaside buffer, wherein the one or more page address mapping are used by the processing kernel; and
- fetching one or more memory pages from backing storage, wherein the fetched memory pages are used by the processing kernel.

5. The method of claim 1, wherein the one or more prefetch kernels have an intermediate state that allows for determining of memory addresses associated with a set of memory operations.

6. The method of claim 1, wherein the executing the one or more prefetch kernels comprises performing a memory access operation for a respective memory page, wherein the respective memory page is accessed more than once by the processing kernel.

7. The method of claim 1, wherein the executing the processing kernel is initiated upon completion of the execution of the one or more prefetch kernels.

8. The method of claim 1 further comprising terminating the execution of the one or more prefetch kernels in response to determining all instructions for the one or more prefetch kernels have been issued and only load operations writing to a cache or to specified destination registers or memory locations private to the prefetch kernel are pending.

9. A system comprising:
- a central processing unit (CPU);
- a prefetch kernel builder logic configured to generate one or more prefetch kernels for a processing kernel, wherein each of the one or more prefetch kernels include one or more memory access instructions that are directed to access memory addresses used in the processing kernel; and
- a graphics processing unit (GPU) configured to execute the one or more prefetch kernels and the processing kernel, wherein the one or more prefetch kernels are executed ahead of the processing kernel to access one or more memory locations before instructions to access the memory locations are executed by the processing kernel.

10. The system of claim 9, wherein the one or more prefetch kernels are generated by identifying memory access instructions from the processing kernel that can be statically determined.

11. The system of claim 9, wherein the one or more prefetch kernels are generated by combining identified memory access instructions from the processing kernel.

12. The system of claim 9, wherein the one or more prefetch kernels are executed by the GPU to perform memory tasks including any one or a combination of the following:
- fetch data from off-chip memory to on-chip memory, wherein the data fetched is used by the processing kernel;
- update one or more page address mapping in a translation lookaside buffer, wherein the one or more page address mapping are used by the processing kernel; and
- fetch one or more memory pages from backing storage, wherein the fetched memory pages are used by the processing kernel.

13. The system of claim 9, wherein the one or more prefetch kernels have an intermediate state that allows for determining of memory addresses associated with a set of memory operations.

14. The system of claim 9, wherein the GPU is further configured to perform a memory access operation for a respective memory page when executing the one or more prefetch kernels, the respective memory page being accessed more than once by the processing kernel.

15. The system of claim 9, wherein the GPU is configured to initiate the execution of the processing kernel upon completion of the execution of the one or more prefetch kernels.

16. The system of claim 9, wherein the GPU is further configured to terminate the execution of the one or more prefetch kernels in response to determining all instructions for the one or more prefetch kernels have been issued and only load operations writing to a cache or to specified destination registers or memory locations private to the prefetch kernel are pending.

17. The system of claim 9, wherein the GPU comprises specialized execution resources for execution of the prefetch kernel.

18. A non-transitory computer-readable storage medium including instructions which, when executed by a device having a central processing unit (CPU) and a graphics processing unit (GPU), cause the device to execute instructions causing the device to perform operations comprising:
- generating one or more prefetch kernels for a processing kernel, wherein each of the one or more prefetch kernels include one or more memory access instructions that are directed to access memory addresses used in the processing kernel; and
- executing, by the GPU, the one or more prefetch kernels and the processing kernel, wherein the one or more prefetch kernels are executed ahead of the processing kernel to access one or more memory locations before instructions to access the memory locations are executed by the processing kernel.

19. The non-transitory computer-readable storage medium of claim 18, wherein the one or more prefetch kernels are generated by identifying memory access instructions from the processing kernel that can be statically determined.

20. The non-transitory computer-readable storage medium of claim 18, wherein the one or more prefetch kernels are generated by combining identified memory access instructions from the processing kernel.

* * * * *